United States Patent
Adler et al.

(10) Patent No.: US 9,053,251 B2
(45) Date of Patent: Jun. 9, 2015

(54) PROVIDING A SIDEBAND MESSAGE INTERFACE FOR SYSTEM ON A CHIP (SOC)

(75) Inventors: Robert P. Adler, Santa Clara, CA (US); Eran Tamari, Ramat Gan (IL); Mikal C. Hunsaker, El Dorado Hills, CA (US); Sridhar Lakshmanamurthy, Sunnyvale, CA (US); Michael T. Klinglesmith, Portland, OR (US); Blaise Fanning, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 333 days.

(21) Appl. No.: 13/306,244

(22) Filed: Nov. 29, 2011

(65) Prior Publication Data

US 2013/0138858 A1    May 30, 2013

(51) Int. Cl.
| | |
|---|---|
| *G06F 13/14* | (2006.01) |
| *G06F 13/42* | (2006.01) |
| *G06F 13/366* | (2006.01) |
| *G06F 13/40* | (2006.01) |

(52) U.S. Cl.
CPC .......... *G06F 13/4221* (2013.01); *G06F 13/366* (2013.01); *G06F 13/4036* (2013.01)

(58) Field of Classification Search
USPC .................. 710/305–306, 240–244; 370/463; 713/322
See application file for complete search history.

(56) References Cited

U.S. PATENT DOCUMENTS

| | | | |
|---|---|---|---|
| 5,493,566 | A | 2/1996 | Ljungberg et al. |
| 6,009,488 | A | 12/1999 | Kavipurapu |
| 6,233,632 | B1 | 5/2001 | Meiyappan et al. |
| 6,330,647 | B1 | 12/2001 | Jeddeloh et al. |
| 6,427,169 | B1 | 7/2002 | Elzur |
| 6,469,982 | B1 | 10/2002 | Henrion et al. |
| 6,611,893 | B1 | 8/2003 | Lee et al. |
| 6,694,380 | B1 | 2/2004 | Wolrich et al. |
| 6,725,313 | B1 | 4/2004 | Wingard et al. |
| 6,810,460 | B1 | 10/2004 | Kirkwood |
| 6,816,938 | B2 | 11/2004 | Edara et al. |
| 7,065,733 | B2 | 6/2006 | Goodnow et al. |
| 7,415,533 | B1 | 8/2008 | Lacroute et al. |

(Continued)

FOREIGN PATENT DOCUMENTS

| | | |
|---|---|---|
| KR | 10-2005-0077437 | 8/2005 |
| KR | 10-2005-0082834 | 8/2005 |
| WO | 2005071553 | 8/2005 |

OTHER PUBLICATIONS

Intel Corporation, "An Introduction to the Intel QuickPath Interconnect," Jan. 2009, pp. 1-22.

(Continued)

*Primary Examiner* — Tim T. Vo
*Assistant Examiner* — Kim T. Huynh
(74) *Attorney, Agent, or Firm* — Trop, Pruner & Hu, P.C.

(57) ABSTRACT

According to one embodiment, a system on a chip includes multiple agents each corresponding to an intellectual property (IP) logic and a fabric to couple the agents. The fabric can include a primary message interface and a sideband message interface. The fabric further includes one or more routers to provide out-of-band communications between the agents via this sideband message interface. To effect such communication, the router can perform a subset of ordering rules of a personal computer (PC)-based specification for sideband messages. Other embodiments are described and claimed.

19 Claims, 10 Drawing Sheets

(56) References Cited

U.S. PATENT DOCUMENTS

| | | |
|---|---|---|
| 7,421,543 B2 | 9/2008 | Suzuki |
| 7,457,905 B2 | 11/2008 | Gehman |
| 7,506,089 B2 | 3/2009 | Cho et al. |
| 7,573,295 B1 | 8/2009 | Stadler |
| 7,673,087 B1 | 3/2010 | Ansari et al. |
| 7,685,346 B2 | 3/2010 | Teh |
| 7,723,902 B2 | 5/2010 | Mandhani et al. |
| 7,734,856 B2 | 6/2010 | Reinig |
| 7,783,819 B2 | 8/2010 | Mandhani |
| 7,793,345 B2 | 9/2010 | Weber et al. |
| 7,873,068 B2 | 1/2011 | Klinglesmith et al. |
| 7,979,592 B1 | 7/2011 | Pettey et al. |
| 7,990,999 B2 | 8/2011 | Lee |
| 8,010,731 B2 | 8/2011 | Mandhani |
| 8,023,508 B2 | 9/2011 | Horton |
| 8,069,286 B1 * | 11/2011 | Orthner et al. ............ 710/62 |
| 8,199,157 B2 | 6/2012 | Park et al. |
| 8,225,019 B2 | 7/2012 | Asnaashari |
| 8,286,014 B2 | 10/2012 | Han et al. |
| 8,364,874 B1 | 1/2013 | Schlansker et al. |
| 8,437,369 B2 | 5/2013 | Shaikli |
| 8,443,422 B2 | 5/2013 | Weber et al. |
| 2002/0038401 A1 | 3/2002 | Zaidi |
| 2003/0088722 A1 | 5/2003 | Price |
| 2003/0126336 A1 | 7/2003 | Creta |
| 2003/0227926 A1 | 12/2003 | Ramamurthy et al. |
| 2004/0177176 A1 | 9/2004 | Li et al. |
| 2004/0218600 A1 | 11/2004 | Medhi et al. |
| 2005/0010687 A1 | 1/2005 | Dai |
| 2005/0120323 A1 | 6/2005 | Goodnow et al. |
| 2005/0137966 A1 | 6/2005 | Munguia et al. |
| 2005/0177664 A1 | 8/2005 | Cho et al. |
| 2005/0289369 A1 | 12/2005 | Chung et al. |
| 2005/0289374 A1 | 12/2005 | Kim et al. |
| 2006/0047849 A1 | 3/2006 | Mukherjee |
| 2006/0101179 A1 | 5/2006 | Lee et al. |
| 2006/0140126 A1 | 6/2006 | Zhong |
| 2006/0218336 A1 | 9/2006 | Ishizawa et al. |
| 2007/0006108 A1 | 1/2007 | Bueti |
| 2007/0067549 A1 | 3/2007 | Gehman |
| 2008/0059441 A1 | 3/2008 | Gaug et al. |
| 2008/0082840 A1 | 4/2008 | Kendall et al. |
| 2008/0147858 A1 | 6/2008 | Prakash et al. |
| 2008/0163005 A1 | 7/2008 | Sonksen et al. |
| 2008/0235415 A1 | 9/2008 | Clark et al. |
| 2008/0288689 A1 | 11/2008 | Hoang et al. |
| 2008/0310458 A1 | 12/2008 | Rijpkema |
| 2009/0006165 A1 | 1/2009 | Teh et al. |
| 2009/0119432 A1 | 5/2009 | Lee et al. |
| 2009/0235099 A1 | 9/2009 | Branover et al. |
| 2009/0249098 A1 | 10/2009 | Han et al. |
| 2009/0296624 A1 | 12/2009 | Ryu et al. |
| 2009/0296740 A1 | 12/2009 | Wagh |
| 2009/0300245 A1 | 12/2009 | Shoemaker et al. |
| 2010/0199010 A1 | 8/2010 | Goren et al. |
| 2010/0220703 A1 | 9/2010 | Farrugia et al. |
| 2010/0235675 A1 | 9/2010 | Subramanian et al. |
| 2010/0262855 A1 | 10/2010 | Buch et al. |
| 2010/0278195 A1 | 11/2010 | Wagh |
| 2010/0293304 A1 | 11/2010 | Alexandron et al. |
| 2010/0312942 A1 * | 12/2010 | Blinick et al. ............ 710/316 |
| 2011/0032947 A1 | 2/2011 | Brueggen |
| 2011/0047272 A1 | 2/2011 | Bosneag |
| 2011/0078315 A1 | 3/2011 | Matsushita et al. |
| 2011/0078356 A1 | 3/2011 | Shoemaker |
| 2011/0093576 A1 | 4/2011 | Cherian et al. |
| 2011/0179212 A1 * | 7/2011 | Hartman ............ 710/309 |
| 2011/0179248 A1 | 7/2011 | Lee |
| 2011/0238728 A1 * | 9/2011 | Nagarajrao et al. ............ 709/202 |
| 2012/0051297 A1 | 3/2012 | Lee et al. |
| 2012/0066468 A1 | 3/2012 | Nakajima et al. |
| 2012/0079590 A1 | 3/2012 | Sastry et al. |
| 2012/0233514 A1 | 9/2012 | Patil et al. |
| 2012/0303842 A1 | 11/2012 | Cardinell et al. |
| 2012/0303899 A1 | 11/2012 | Ash et al. |
| 2012/0311213 A1 | 12/2012 | Bender et al. |
| 2013/0054845 A1 | 2/2013 | Nimmala et al. |
| 2013/0089095 A1 | 4/2013 | Chen et al. |

OTHER PUBLICATIONS

Sousek, et al., "PCI Express Core Integration with the OCP Bus," CAST, Inc. 2006, 15 pages.

Mentor Graphics, "PCI Express to AMBA 3 AXI Bridge IP," Mentor Graphics, Jun. 2007, 2 pages.

Everton Carara, et al., "Communication Models In Networks-on-Chip," 18th IEEE/IFIP International Workshop on Rapid System Prototyping (RSP '07), 2007, pp. 57-60.

U.S. Patent and Trademark Office, Office Action mailed Jun. 7, 2013 with Reply filed Sep. 3, 2013, in U.S. Appl. No. 13/248,232.

U.S. Patent and Trademark Office, Office Action mailed Jun. 20, 2013 with Reply filed Sep. 18, 2013, in U.S. Appl. No. 13/248,243.

U.S. Patent and Trademark Office, Office Action mailed Apr. 23, 2013 with Reply filed Jul. 22, 2013, in U.S. Appl. No. 13/248,263.

U.S. Patent and Trademark Office, Office Action mailed Jun. 14, 2013 with Reply filed Sep. 9, 2013, in U.S. Appl. No. 13/248,270.

U.S. Patent and Trademark Office, Office Action mailed Jun. 20, 2013 with Reply filed Sep. 17, 2013, in U.S. Appl. No. 13/248,276.

U.S. Patent and Trademark Office, Office Action mailed Sep. 18, 2013, in U.S. Appl. No. 13/248,252.

U.S. Appl. No. 13/248,234, filed Sep. 29, 2011, entitled, "Sending Packets With Expanded Headers", by Sridhar Lakshmanamurthy, et al.

U.S. Appl. No. 13/248,232, filed Sep. 29, 2011, entitled, "Common Idle State, Active State and Credit Management for an Interface", by Sridhar Lakshmanamurthy, et al.

U.S. Appl. No. 13/248,243, filed Sep. 29, 2011, entitled, "Aggregating Completion Messages in a Sideband Interface", by Sridhar Lakshmanamurthy, et al.

U.S. Appl. No. 13/248,252, filed Sep. 29, 2011, entitled, "Providing Error Handling Support to Legacy Devices", by Sridhar Lakshmanamurthy, et al.

U.S. Appl. No. 13/248,263, filed Sep. 29, 2011, entitled, "Providing Multiple Decode Options for a System-On-Chip (SoC)", by Sridhar Lakshmanamurthy, et al.

U.S. Appl. No. 13/248,270, filed Sep. 29, 2011, entitled, "Supporting Multiple Channels of a Single Interface", by Sridhar Lakshmanamurthy, et al.

U.S. Appl. No. 13/248,276, filed Sep. 27, 2011, entitled, "Issuing Requests to a Fabric", by Sridhar Lakshmanamurthy, et al.

U.S. Appl. No. 13/222,362, filed Aug. 31, 2011, entitled, "Integrating Intellectual Property (IP) Blocks Into a Processor", by Prashanth Nimmala, et al.

U.S. Appl. No. 13/222,354, filed Aug. 31, 2011, entitled, "Providing Adaptive Bandwidth Allocation for a Fixed Priority Arbiter", by Kie Woon Lim, et al.

U.S. Appl. No. 14/497,567, filed Sep. 26, 2014, entitled, "Providing A Sideband Message Interface for System On A Chip (SoC)," by Robert P. Adler, et al.

U.S. Patent and Trademark Office, Office Action mailed Dec. 3, 2013, with Reply filed Feb. 26, 2014, in U.S. Appl. No. 13/248,234.

U.S. Patent and Trademark Office, Final Office Action mailed Jun. 13, 2014, with Reply to Final filed Aug. 7, 2014 in U.S. Appl. No. 13/248,234.

U.S. Patent and Trademark Office, Final Office Action mailed Apr. 8, 2014, with Reply filed Jun. 6, 2014, in U.S. Appl. No. 13/248,252.

U.S. Patent and Trademark Office, Office Action mailed Apr. 23, 2014, with Reply filed Jul. 22, 2014, in U.S. Appl. No. 13/222,362.

U.S. Patent and Trademark Office, Office Action mailed Mar. 31, 2014, with Reply filed Jun. 26, 2014, in U.S. Appl. No. 13/222,354.

U.S. Patent and Trademark Office, Final Office Action mailed Jul. 7, 2014, with Reply filed Aug. 22, 2014 in U.S. Appl. No. 13/222,354.

PCI-SIG, "PCI Local Bus Specification, Revision 3.0," Feb. 3, 2004, 3 pages.

U.S. Appl. No. 14/326,654, filed Jul. 9, 2014, entitled "Common Idle State, Active State and Credit Management for an Interface", by Sridhar Lakshmanamurthy, et al.

(56) References Cited

OTHER PUBLICATIONS

U.S. Appl. No. 14/209,207, filed Mar. 13, 2014, entitled "Aggregating Completion Messages in a Sideband Interface", by Sridhar Lakshmanamurthy, et al.
U.S. Appl. No. 14/209,184, filed Mar. 13, 2014, entitled "Providing Multiple Decode Options for a System-On-Chip (SoC) Fabric", by Sridhar Lakshmanamurthy, et al.
U.S. Appl. No. 14/209,146, filed Mar. 13, 2014, entitled "Supporting Multiple Channels of A Single Interface", by Sridhar Lakshmanamurthy, et al.
U.S. Appl. No. 14/295,810, filed Jun. 4, 2014, entitled "Issuing Requests to a Fabric", by Sridhar Lakshmanamurthy, et al.
U.S. Patent and Trademark Office, Office Action mailed Jul. 22, 2014, in U.S. Appl. No. 14/295,810.

* cited by examiner

PROVIDING A SIDEBAND MESSAGE INTERFACE FOR SYSTEM ON A CHIP (SOC)

BACKGROUND

Mainstream processor chips, both in high performance and low power segments, are increasingly integrating additional functionality such as graphics, display engines, security engines, PCIe™ ports (i.e., ports in accordance with the Peripheral Component Interconnect Express (PCI Express™ (PCIe™)) Specification Base Specification version 2.0 (published 2007) (hereafter the PCIe™ specification) and other PCIe™ based peripheral devices, while maintaining legacy support for devices compliant with a PCI specification such as the Peripheral Component Interconnect (PCI) Local Bus Specification, version 3.0 (published 2002) (hereafter the PCI specification).

Such designs are highly segmented due to varying requirements from the server, desktop, mobile, embedded, ultra-mobile and mobile Internet device segments. Different markets seek to use single chip system-on-chip (SoC) solutions that combine at least some of processor cores, memory controllers, input/output controllers and other segment specific acceleration elements onto a single chip. However, designs that accumulate these features are slow to emerge due to the difficulty of integrating different intellectual property (IP) blocks on a single die. This is especially so, as IP blocks can have various requirements and design uniqueness, and can require many specialized wires, communication protocols and so forth to enable their incorporation into an SoC. As a result, each SoC or other advanced semiconductor device that is developed requires a great amount of design complexity and customization to incorporate different IP blocks into a single device. This is so, as a given IP block typically needs to be re-designed to accommodate interface and signaling requirements of a given SoC, particularly with regard to out-of-band communications such as interrupts, power management information and so forth.

DETAILED DESCRIPTION

To enable ease of integration of agents within a system on-chip (SoC), in various embodiments a standardized sideband message interface can be provided. This sideband message interface can be instantiated within each agent and a fabric that couples together the agents. To this end, the fabric can include router circuitry coupled to the various agents to provide for communication of messages on this sideband link, which may be a secondary message channel to a primary message interface over which high priority communications can occur. By provision of a sideband message interface having a relatively small number of wires, integration of agents into an SoC can occur more easily. At the same time, flexibility can be provided to enable customization of communications along the sideband interface for a particular design.

Embodiments can be used in many different types of systems. As examples, implementations described herein may be used in connection with semiconductor devices such as processors or other semiconductor devices that can be fabricated on a single semiconductor die. In particular implementations, the device may be a SoC or other advanced processor or chipset that includes various homogeneous and/or heterogeneous processing agents, and additional components such as networking components, e.g., routers, controllers, bridge devices, devices, memories and so forth.

Some implementations may be used in a semiconductor device that is designed according to a given specification such as an integrated on-chip system fabric (IOSF) specification issued by a semiconductor manufacturer to provide a standardized on-die interconnect protocol for attaching intellectual property (IP) blocks within a chip, including a SoC. Such IP blocks can be of varying types, including general-purpose processors such as in-order or out-of-order cores, fixed function units, graphics processors, IO controllers, display controllers, media processors among many others. By standardizing an interconnect protocol, a framework is thus realized for a broad use of IP agents in different types of chips. Accordingly, not only can the semiconductor manufacturer efficiently design different types of chips across a wide variety of customer segments, it can also, via the specification, enable third parties to design logic such as IP agents to be incorporated in such chips. And furthermore, by providing multiple options for many facets of the interconnect protocol, reuse of designs is efficiently accommodated. Although embodiments are described herein in connection with this IOSF specification, understand the scope of the present invention is not limited in this regard and embodiments can be used in many different types of systems.

Figure 1:
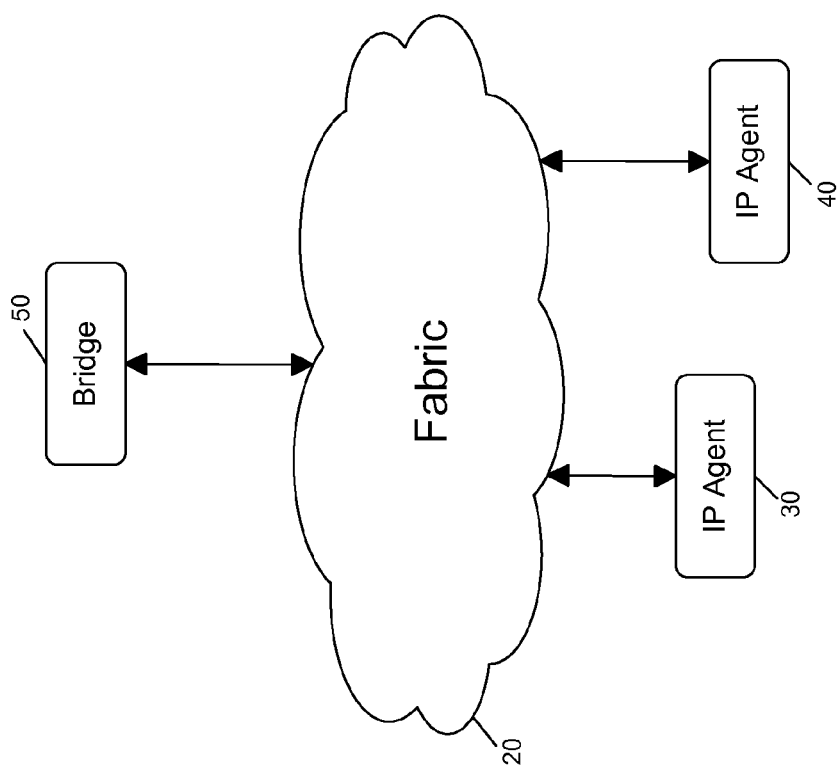
FIG. 1 is a block diagram of a basic interconnect architecture in accordance with an embodiment of the present invention.

Referring now to FIG. 1, shown is a block diagram of a basic interconnect architecture in accordance with an embodiment of the present invention. As shown in FIG. 1, system 10 may be a portion of a system-on-chip or any other semiconductor device such as a highly integrated processor complex or an integrated IO hub, and includes a fabric 20 that acts as an interconnect between various components. In the implementation shown, these components include IP agents 30 and 40, which can be independent IP blocks to provide various functionality such as compute capabilities, graphics capabilities, media processing capabilities and so forth. These IP agents are thus IP blocks or logical devices having an interface that is compliant with the IOSF specification, in one embodiment. As further seen, fabric 20 also interfaces to a bridge 50. Although not shown for ease of illustration in the embodiment of FIG. 1, understand that bridge 50 may act as an interface to other system components, e.g., on the same chip or on one or more different chips.

As will be described further below, each of the elements shown in FIG. 1, namely the fabric, the IP agents, and the bridge may include one or more interfaces to handle communication of various signals. These interfaces may be defined according to the IOSF specification, which defines signals for communication on these interfaces, protocols used for information exchange between agents, arbitration and flow control mechanisms used to initiate and manage information exchange, supported address decoding and translation capabilities, messaging for in-band or out-of-band communication, power management, test, validation and debug support.

The IOSF specification includes 3 independent interfaces that can be provided for each agent, namely a primary interface, a sideband message interface and a testability and debug interface (design for test (DFT), design for debug (DFD) interface). According to the IOSF specification, an agent may support any combination of these interfaces. Specifically, an agent can support 0-N primary interfaces, 0-N sideband message interfaces, and optional DFx interfaces. However, according to the specification, an agent must support at least one of these 3 interfaces.

Figure 2:
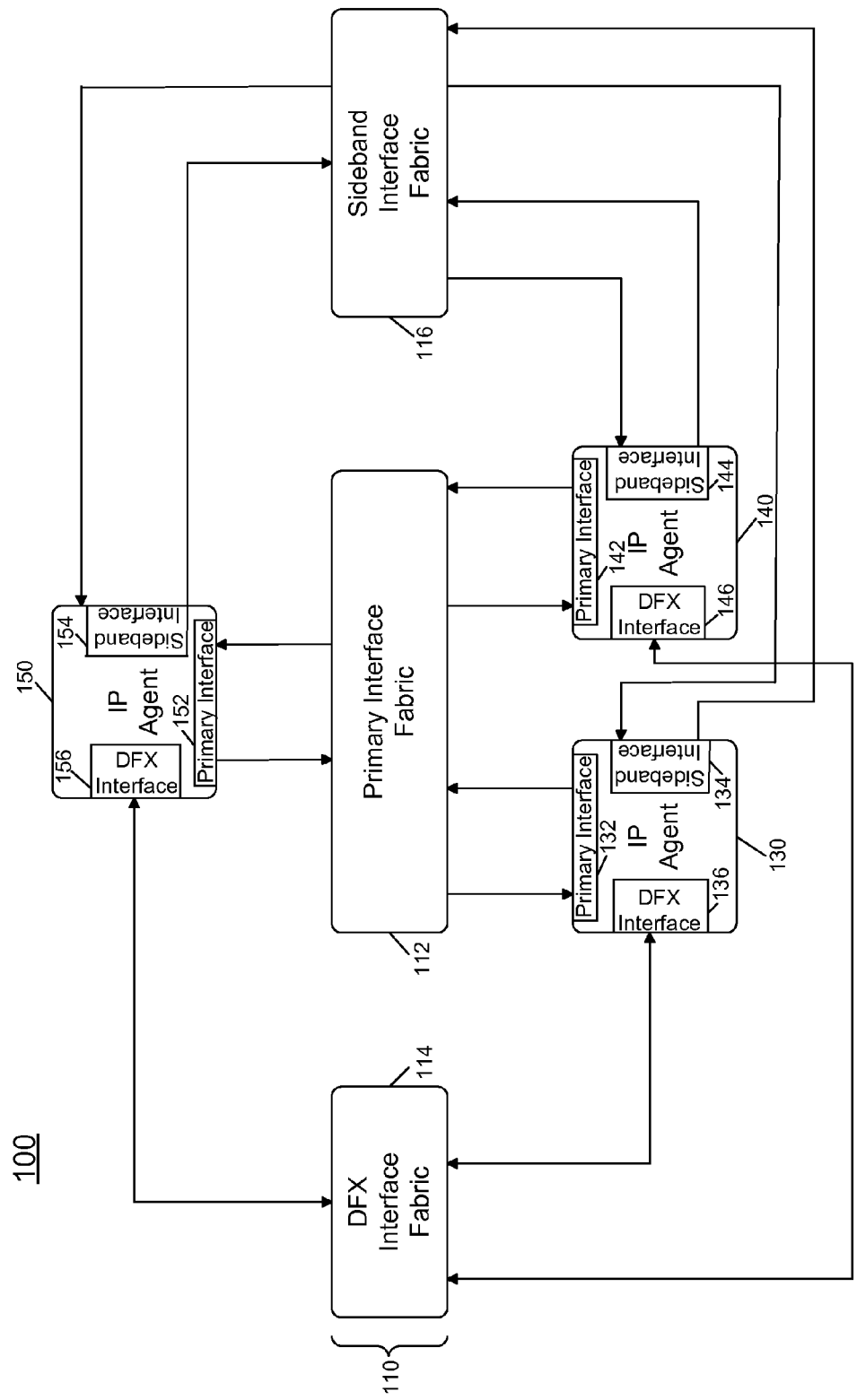
FIG. 2 is a block diagram of further details of an interconnect architecture in accordance with an embodiment of the present invention.

Fabric 20 may be a hardware element that moves data between different agents. Note that the topology of fabric 20 will be product specific. As examples, a fabric can be implemented as a bus, a hierarchical bus, a cascaded hub or so forth. Referring now to FIG. 2, shown is a block diagram of further details of an interconnect architecture in accordance with an embodiment of the present invention. As shown in FIG. 2, the IOSF specification defines three distinct fabrics, namely a primary interface fabric 112, a DFx fabric 114, and a sideband fabric 116. Primary interface fabric 112 is used for all in-band communication between agents and memory, e.g., between a host processor such as a central processing unit (CPU) or other processor and an agent. Primary interface fabric 112 may further enable communication of peer transactions between agents and supported fabrics. All transaction types including memory, input output (IO), configuration, and in-band messaging can be delivered via primary interface fabric 112. Thus the primary interface fabric may act as a high performance interface for data transferred between peers and/or communications with upstream components.

In various implementations, primary interface fabric 112 implements a split transaction protocol to achieve maximum concurrency. That is, this protocol provides for a request phase, a grant phase, and a command and data phase. Primary interface fabric 112 supports three basic request types: posted, non-posted, and completions, in various embodiments. Generally, a posted transaction is a transaction which when sent by a source is considered complete by the source and the source does not receive a completion or other confirmation message regarding the transaction. One such example of a posted transaction may be a write transaction. In contrast, a non-posted transaction is not considered completed by the source until a return message is received, namely a completion. One example of a non-posted transaction is a read transaction in which the source agent requests a read of data. Accordingly, the completion message provides the requested data.

In addition, primary interface fabric 112 supports the concept of distinct channels to provide a mechanism for independent data flows throughout the system. As will be described further, primary interface fabric 112 may itself include a master interface that initiates transactions and a target interface that receives transactions. The primary master interface can further be sub-divided into a request interface, a command interface, and a data interface. The request interface can be used to provide control for movement of a transaction's command and data. In various embodiments, primary interface fabric 112 may support PCI ordering rules and enumeration.

In turn, sideband interface fabric 116 may be a standard mechanism for communicating all out-of-band information. In this way, special-purpose wires designed for a given implementation can be avoided, enhancing the ability of IP reuse across a wide variety of chips. Thus in contrast to an IP block that uses dedicated wires to handle out-of-band communications such as status, interrupt, power management, fuse distribution, configuration shadowing, test modes and so forth, a sideband interface fabric 116 according to the IOSF specification standardizes all out-of-band communication, promoting modularity and reducing validation requirements for IP reuse across different designs. In one embodiment, sideband interface fabric 116 provides a point-to-point network with endpoints, routers, and a network to interconnect the routers. The sideband message interface can be used for status, power management, configuration shadowing, and test modes. This interface is intended to be low performance and in various embodiments may not support high bandwidth, low-latency, or performance critical data transfers between agents. In general, sideband interface fabric 116 may be used to communicate non-performance critical information, rather than for performance critical data transfers, which typically may be communicated via primary interface fabric 112.

As further illustrated in FIG. 2, IP agents 130, 140, and 150 may each include a corresponding primary interface, a sideband interface and a DFx interface. However, as discussed above, each agent need not include every one of these interfaces, and a given IP agent may include only a single interface, in some embodiments.

Figure 3:
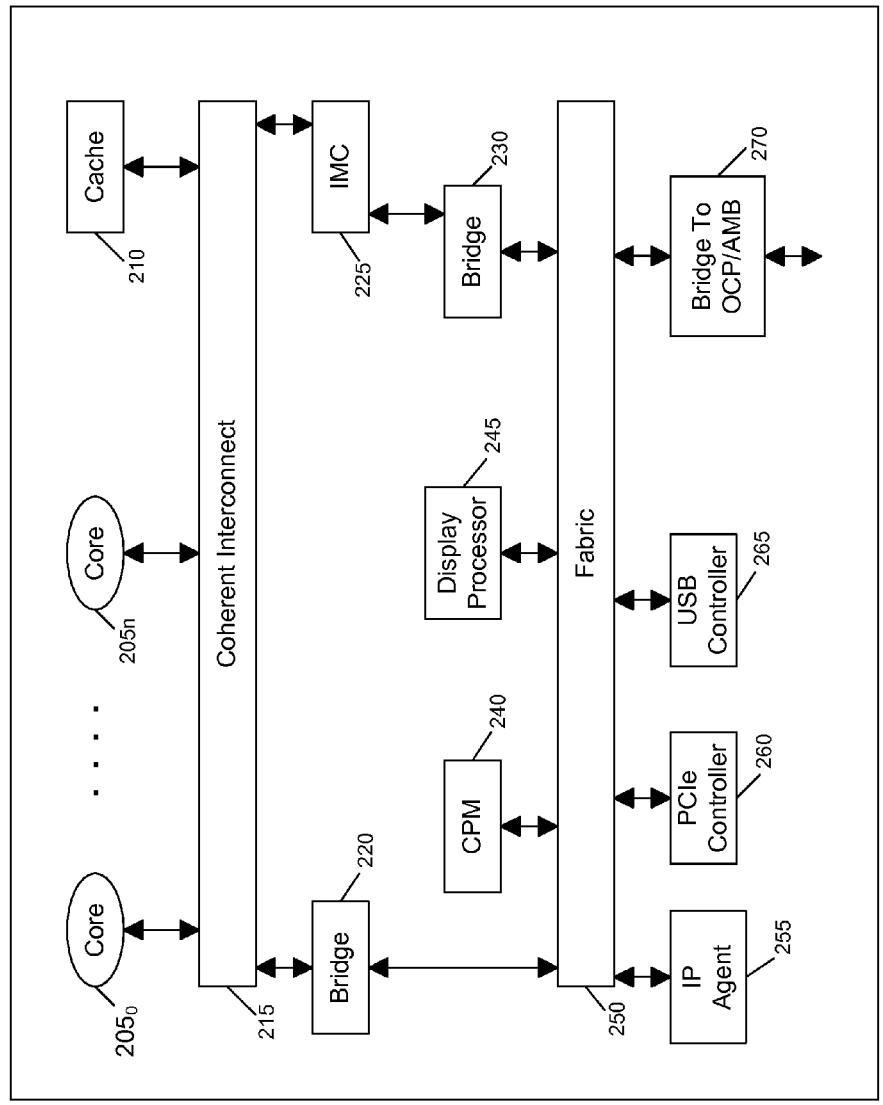
FIG. 3 is a high level block diagram of a SoC in accordance with an embodiment of the present invention.

Using an IOSF specification, various types of chips can be designed having a wide variety of different functionality. Referring now to FIG. 3, shown is a high level block diagram of a SoC in accordance with an embodiment of the present invention. As shown in FIG. 3, SoC 200 may include various components, all of which can be integrated on a single semiconductor die to provide for various processing capabilities at high speeds and low power, consuming a comparatively small amount of real estate. As seen in FIG. 3, SoC 200 includes a plurality of cores $205_0$-$205_n$. In various embodiments, cores 205 can be relatively simple in-order cores or more complex out-of-order cores. Or a combination of in-order and out-of-order cores can be present in a single SoC. As seen, cores 205 can be interconnected via a coherent interconnect 215, which further couples to a cache memory 210, e.g., a shared last level cache (LLC). Although the scope of the present invention is not limited in this regard, in one embodiment coherent interconnect 215 may be in accordance with the Quick Path Interconnect (QPI)™ specification available from Intel Corporation, Santa Clara, Calif.

As further seen in FIG. 3, coherent interconnect 215 may communicate via a bridge 220 to a fabric 250, which may be an IOSF fabric. Coherent interconnect 215 may further communicate via an integrated memory controller 215 to an off-chip memory (not shown for ease of illustration the embodiment of FIG. 3), and further through bridge 230 to fabric 250.

As further seen in FIG. 3, various components can couple to fabric 250 including a content processing module (CPM) 240 which can be used for performing various operations such as security processing, cryptographic functions and so forth. In addition, a display processor 245 can be part of a media processing pipeline that renders video for an associated display.

As further seen, fabric 250 may further couple to an IP agent 255. Although only a single agent is shown for ease of illustration in the FIG. 3 embodiment, understand that multiple such agents are possible in different embodiments. In addition, to enable communication with other on-chip devices, fabric 250 may further communicate with a PCIe™ controller 260 and a universal serial bus (USB) controller 265, both of which can communicate with various devices according to these protocols. Finally, shown in the embodiment of FIG. 3 is a bridge 270, which can be used to communicate with additional components of other protocols, such as an open core protocol (OCP) or an ARM advanced microcontroller bus architecture (AMBA) protocol. Although shown with these particular components in the embodiment of FIG. 3, understand that the scope of the present invention is not limited in this way and in different embodiments additional or different components may be present.

Figure 4:
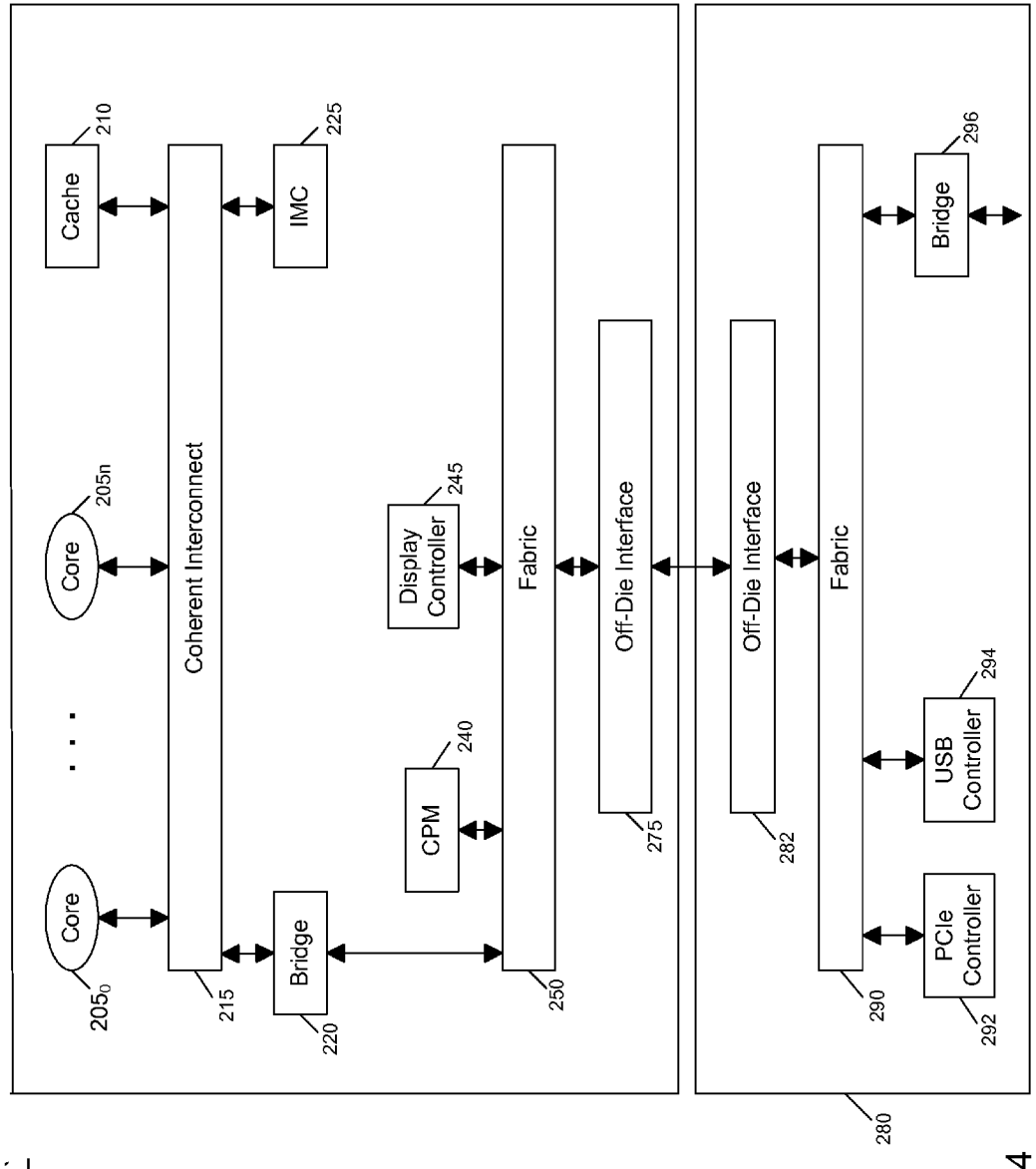
FIG. 4 is a block diagram of a system in accordance with another embodiment of the present invention.

Furthermore, understand that while shown as a single die SoC implementation in FIG. 3, embodiments can further be implemented in a system in which multiple chips communicate with each other via a non-IOSF interface. Referring now to FIG. 4, shown is a block diagram of a system in accordance with another embodiment of the present invention. As shown in FIG. 4, the system may include a SoC 200', which may include many components similar to those discussed above with regard to FIG. 3, and an additional off-die interface 275. Accordingly, SoC 200' can communicate with another chip 280 which may include various functionality to enable communication between these two chips, as well as to various off-chip devices such as different peripherals according to one or more different specifications. Specifically, a second chip 280 is shown to include an off-die interface 282 to enable communication with SoC 200', and which in turn communicates with a fabric 290, which may be an IOSF fabric according to an embodiment of the present invention. As seen, fabric 290 may further be coupled to various controllers in communication with off-chip devices, including a PCIe™ controller 292, a USB controller 294, and a bridge 296.

Figure 5:
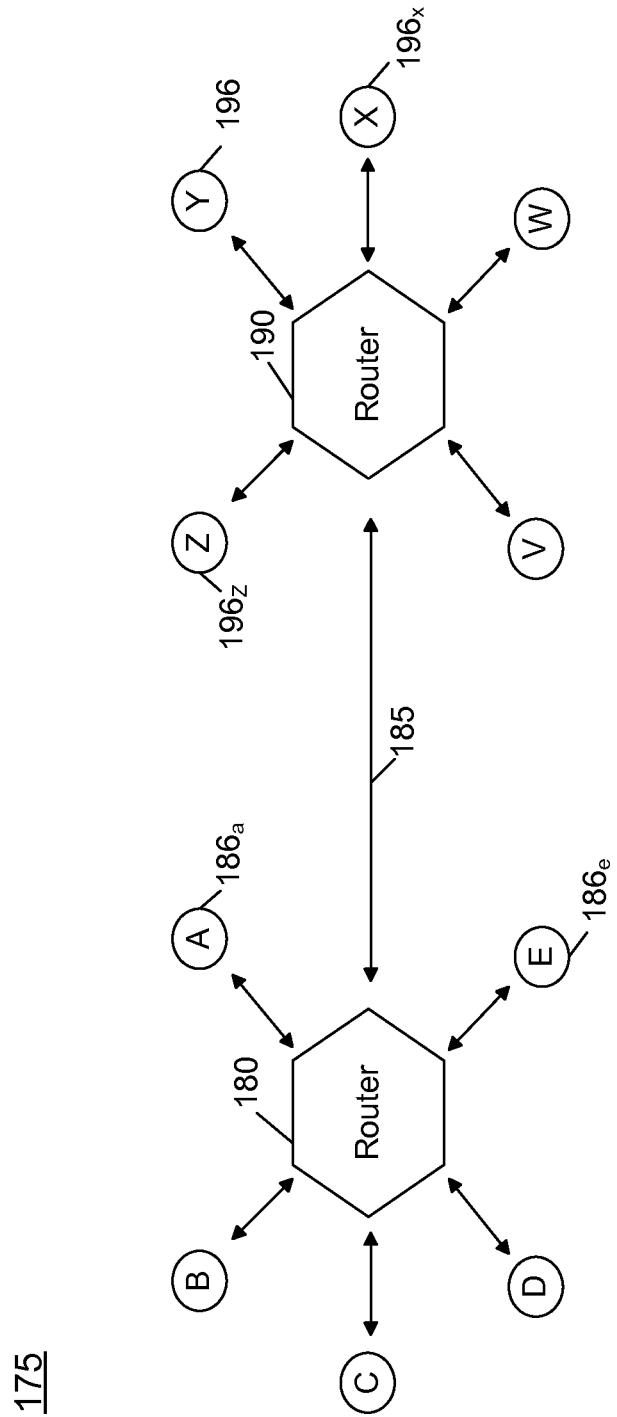
FIG. 5 is a block diagram of a sideband interconnection in accordance with an embodiment of the present invention.

As discussed above, in various embodiments all out-of-band communications may be via a sideband message interface. Referring now to FIG. 5, shown is a block diagram of a sideband interconnection in accordance with an embodiment of the present invention. As shown in FIG. 5, sideband interface system 175 includes multiple routers 180 and 190, which are shown in the embodiment of FIG. 5 as being coupled via a point-to-point (PTP) interconnect 185. In turn, each router can be coupled to various endpoints, which can be, for example, IP agents or other components of a given system. Specifically, router 180 couples to a plurality of endpoints 186a-186e and router 190 couples to a plurality of endpoints 196x-196z.

As shown in FIG. 5, a sideband endpoint is always connected to a sideband router. Both sideband endpoint and router have two interfaces: a master interface and a target interface. An endpoint is a physical component used by an agent to initiate or receive messages over the sideband message interface. This endpoint can be associated with at least one port ID. Endpoints communicate with each other by sending messages that travel over point-to-point interface links through routers in the fabric. Endpoints reside in agents, whereas routers reside in the fabric. A link is made up of two message channels, each of which provides unidirectional communication between two sideband message interface components. Every endpoint communicates with a single router, providing target information through the use of a port ID within the message. Routers forward messages through their ports to other endpoints in the sideband message fabric according to the target specified in the message's port ID and an internal port-to-port mapping table compiled in each router. A node on a router can be the destination for any number of ports. An example of this would be if one node on a router was a link to another router.

Multiple routers may be cascaded in the system to handle more complex topologies. This allows the ability to minimize routing from one area of the chip to another by using local routers in each area connected by a single link. As such, the sideband message interface topology is a tree structure, where all endpoints are leaf nodes. There is a single path from a given port to another. In addition, the fabric topology can take into account power wells that may be powered down. In some embodiments, the sideband message interface endpoints in a network can be in different clock domains and the routers in the fabric can implement appropriate structures to handle the crossover from one domain to another.

Figure 6:
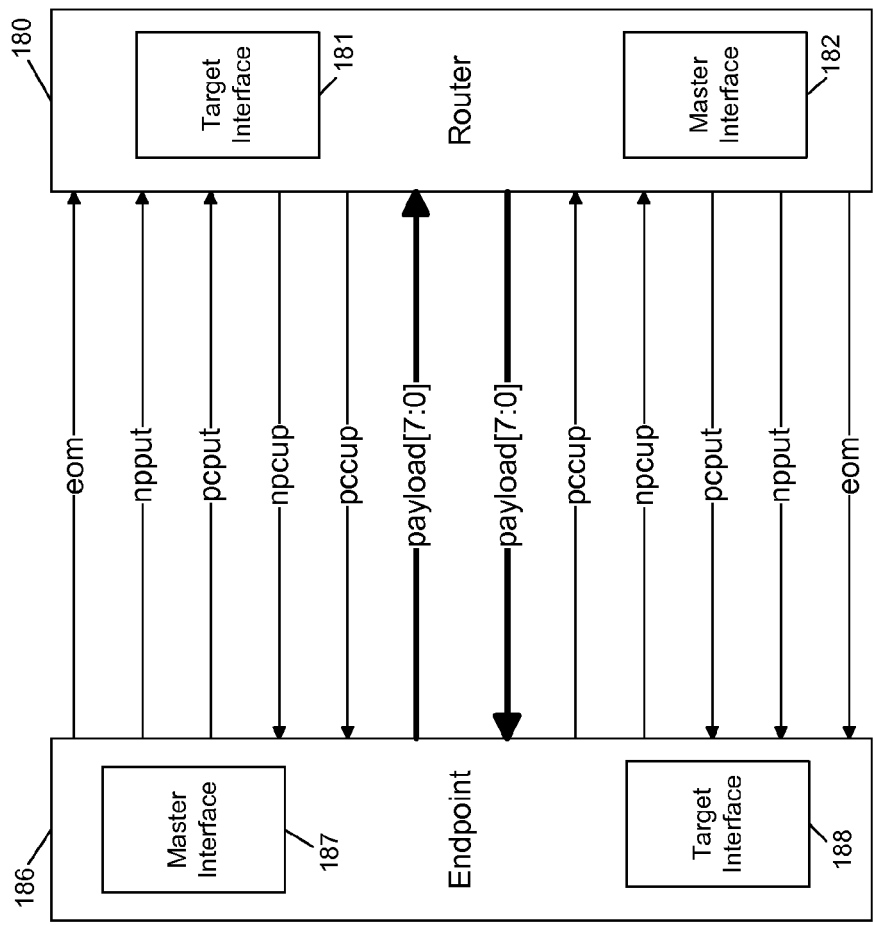
FIG. 6 is a block diagram of details of signaling available for a sideband interface in accordance with an embodiment of the present invention.

Referring now to FIG. 6, shown is a block diagram of details of signaling available for a sideband interface in accordance with an embodiment of the present invention. As shown in FIG. 6, interconnection between a router 180 and an endpoint 186 is shown. As seen, router 180 may include a target interface 181 and a master interface 182. In general, target interface 181 may be configured to receive incoming signals, while master interface 182 may be configured to transmit outgoing signals. As seen, endpoint 186 also includes a master interface 187 and a target interface 188.

FIG. 6 further shows details of the various signaling available for the sideband interface, including credit information, put information, end of message signaling, and data. Specifically, credit updates can be communicated via sideband interfaces as a non-posted credit update signal (NPCUP) and a posted credit update signal (PCCUP). In addition, put signals may be provided (NPPUT and PCPUT). In addition, an end of message (EOM) signal can be communicated. Finally, data may be communicated via payload packets which in one embodiment can be implemented via a byte-wide communication channel. Although shown with this particular implementation in the embodiment of FIG. 6, the scope of the present invention is not limited in this regard. Whenever a credit Put signal is high, this means that a credit is being returned. Whenever a put signal is high, it means that the payload (e.g., data) signal is valid. Whenever a Put and EOM are high at the same time, it means that the current payload is the last payload of the message. Note that the interface can both "put" a data payload and "put" a credit in the same clock cycle.

A sideband interface in accordance with an embodiment of the present invention can be implemented as a serial message interface (instead of many parallel sideband wires) to simplify structural layout requirements. The following are examples of communication types that may be sent via a sideband message interface: on-chip power management control; propagating shadow configuration register reads/writes; test modes and testability controls; back-door access to device configuration space; and virtual wires (namely encoding a wire into a sideband message interface message to avoid routing congestion across the chip).

Thus as seen in FIG. 6, the sideband message interface is a small set of signals between an endpoint and a router that is composed of two communication channels, each having a number of data communication signals traveling in one direction (master to target) and two credit update signals traveling in the other direction (target to master).

In various embodiments, the sideband message interface defines an 8 or 16-bit serial interface for compliant agents. The master agent encodes the message packet into a series of 8 or 16-bit flow control units (flits), and the target agent can decode these flits to decipher the message. The fabric has no knowledge of the message details, in various embodiments. Routing of packets from one agent to another can be accommodated solely based on port IDs.

The sideband message interface is defined to minimize wire count. It also removes any knowledge of message types from the fabric. In other words, routers are message indifferent. Each communication channel has a master and a target interface. The signal names are mandated for endpoints. Since a router will typically connect multiple endpoints, the signal names used in the router need to be unique. At the top level of a design, they will likely contain information about the master and target interfaces connected. Transactions across the sideband message interface happen at a sideband clock rate. Should routers connect endpoints with different payload data widths, multiplexing and demultiplexing may occur within the router. Similarly, any clock or power well synchronization that may be required occurs in the fabric.

Referring now to Tables 1 and 2, described are the sideband message interface signals present in accordance with one embodiment of the present invention.

TABLE 1

| Signal | Width | IO | Description |
| --- | --- | --- | --- |
| mnpput | 1 | O | Non-Posted Put from master to target |
| mncput | 1 | O | Posted or Completion Put from master to target |
| mnpcup | 1 | I | Non-Posted Credit Update from target to master |
| mpccup | 1 | I | Posted or Completion Credit Update from target to master |
| meom | 1 | O | End of Message from master to target |
| mpayload | 8/16 | O | Message Payload from master to target |

TABLE 2

| Signal | Width | IO | Description |
| --- | --- | --- | --- |
| tnpput | 1 | I | Non-Posted Put from master to target |
| tpcput | 1 | I | Posted or Completion Put from master to target |
| tnpcup | 1 | O | Non-Posted Credit Update from target to master |
| tpccup | 1 | O | Posted or Completion Credit Update from target to master |
| teom | 1 | I | End of Message from master to target |
| tpayload | 8/16 | I | Message Payload from master to target |

The corresponding master and target signals are identical. For example, mnpput is the non-posted message flit valid indicator from master to target, while tnpput is the identical signal indicating a valid non-posted message flit in the other direction: target to master. A sideband in accordance with an embodiment of the present invention supports both non-posted and posted/completion message types. Since message flits can be interleaved, separate non-posted and posted/completion "put" and "credit update" signals are defined.

A non-posted put (mnpput/tnpput) signal may be 1 bit, and used to indicate a valid 8- or 16-bit flit sent over the link from sender to receiver, where the flit is part of a non-posted message packet. A posted or completion put (mpcput/tpcput) signal may be 1 bit, and used to indicate a valid 8 or 16-bit flit sent over the link from sender to receiver, where the flit is part of a posted request or a completion response message packet. A non-posted credit update (mnpcup/tnpcup) signal may be 1 bit, and used to indicate a credit update for an 8 or 16-bit, non-posted flit from receiver to sender. A posted or completion credit update (mpccup/tpccup) signal may be 1 bit, and used to indicate a credit update for an 8- or 16-bit, posted or completion flit from receiver to sender. A end of message (meom/teom) signal may be 1 bit, and used to indicate the end of a message. It is driven from the sender together with mnpput or mpcput to indicate the last flit of a message packet. A payload (mpayload/tpayload) signal may be 8 or 16 bits, and used to carry the message flits from sender to receiver. Driven by the sender, it can be either 8 or 16 bits wide and communicated via a payload channel of the link, and is valid whenever the sender asserts mnpput or mpcput.

Flow control is based on a simple credit scheme. In general, all outputs are registered (driven from a flip-flop). Messages are sent to and from endpoints, in multiple clock cycles, one flit at a time. Flits are transferred over the payload data signals, one per clock cycle. Multiple flits make up a sideband message. Message flits are valid, and transfer to a receiver whenever mpcput or mnpput are asserted by the sender. During transfer of the last flit of a message, the sender also asserts the end of message signal, meom.

A master agent can send a message flit when at least one credit is available. A target agent accepts a message flit if one is sent. There is no mechanism for the target to reject or stall a message flit, once the target has issued a credit. For 8-bit payload endpoints, a flit is one byte. For 16-bit payload endpoints, a flit is two bytes. Each credit corresponds to one flit of a message. For 8-bit payload endpoints, a credit corresponds to one byte of message. For 16-bit payload endpoints, a credit corresponds to two bytes. Resolving credits when transferring between 8- and 16-bit endpoints is the router's responsibility.

Associated with each physical endpoint is one or more logical port IDs. These port IDs are used to route messages from source to destination. A logical port ID is mapped to a physical node ID within the routers. In most cases, a port ID is assigned to exactly one physical endpoint. However, it is possible to assign a port ID to a group of physical endpoints. In this case, the logical port ID is also referred to as a group port ID. The group port ID can be used to define multicast groups. For example, when an agent sends a message to a group port ID, the sideband message interface routers will propagate the message to all endpoints within that group. In a given network, all port IDs are unique. A duplicate port ID in a system is allowed only when that end point is not accessible from multiple, independent networks.

The assignment of logical port IDs to physical endpoints and router port-to-node mapping may be done by hardware straps or any other device-specific mechanism. In one embodiment, the port ID FFh can be used as a broadcast port ID. Broadcast messages can be propagated by routers to all endpoints, except the endpoint which sent the message. Broadcast and multicast messages are not reflected back to the ingress port, in one embedment. A unicast message may reflect back to the ingress port; however, any endpoint targeting itself accepts and handles the message and the potential completion message also is returned to itself. In one embodiment, the port ID FEh is reserved and is used as the source ID by any endpoint initiating multicast/broadcast non-posted requests that require a single aggregated completion back from the fabric. In this case, the routers must record the port ID of the initiator of the message, and perform completion aggregation when returning the completions to the initiator.

The following table provides a set of protocol rules for a sideband interface in accordance with an embodiment of the present invention. Note that although described with this particular rule set for this embodiment, understand that variations are possible.

TABLE 3

| Rule | |
|---|---|
| Rule 1. | All agent sideband interface outputs are driven directly off of a flop. The only exception to this rule is the side_clkreq output signal. |
| Rule 2. | To avoid deadlock, endpoints are not allowed to create a dependency in which the acceptance of a Posted message or Completion is dependent on the transmission of any other message. |
| Rule 3. | To avoid deadlock in the case of a Posted-Posted dependency where an endpoint must generate a Posted transaction in response to receiving a Posted transaction, the endpoint must have the appropriate resources to accept all Posted messages sent to it that require a Posted response. |
| Rule 4. | To avoid deadlock, endpoints are not allowed to create a dependency in which the acceptance of a Non-Posted request is dependent on the transmission of a Non-Posted request. |
| Rule 5. | An endpoint is not allowed to make the Completion of a Non-Posted message, for which the endpoint is the Completer, contingent upon another endpoint completing a transaction for which the endpoint is the Requester. |
| Rule 6. | An endpoint must preallocate resources for all Non-Posted requests that it has outstanding. |
| Rule 7. | The router is expected to replicate messages once per physical port, for broadcast and multicast messages. Unicast messages are routed to one physical port. |
| Rule 8. | Messages sent to the Broadcast Port ID or Group Port ID (multicast) may be either Posted or Non-Posted. However, in the case of a Non-Posted operation, the sender uses 0xFE as its source Port ID if it requires the fabric and agents with multiple Port IDs to aggregate all Completions. In other words, by using 0xFE as source Port ID, a single Completion is guaranteed to be returned to the sender. If the source does not use 0xFE as the source Port ID, then it is the source's responsibility to sink and track all Completions. The router does not issue broadcast or multicast messages to the originating or powered down ports. |
| Rule 9. | If the router does not aggregate, it forwards the Completions to the Requester. If the router aggregates, it uses the broadcast/multicast port ID 0xFE as the destination Port ID of the aggregated Completion.<br>Note: Routing an aggregated Completion with DestID 0xFE is implementation specific. One implementation option for routers is to track the ingress port of multicast read requests that have a SrcID 0xFE for routing of aggregated Completions. |
| Rule 10. | All Non-Posted messages received by an endpoint must be completed by that endpoint in order to allow forward progress on the sideband interface. |
| Rule 11. | Aggregated Completions are collected in the router, and a single response status is returned. Routers apply a "bitwise OR" operation to the Completion response status they receive before sending the aggregated Completion to the ingress port. When aggregating Completions with data, the data returned to the Requester is the bitwise OR of the corresponding data from each Completer. If a combination of Completion with data and Completion without data responses are received by the router, then the aggregated Completion shall be a Completion with data message where the aggregated response status field is the bitwise OR of the status fields of all received Completion messages and the aggregated data is the bitwise OR of the data from all received Completion with data messages. Any Completion synthesized by the router, such as for a powered down endpoint, shall be considered as a received Completion for the purposes of this rule. |
| Rule 12. | Sideband agents with multiple PortIDs send a single aggregated completion for non-posted messages with Source PortID 0xFE. Sideband agents with multiple PortIDs that aggregate completions must follow all aggregation rules defined for routers in this specification. |
| Rule 13. | Completing agents must ensure in-order completions for non-posted messages with the same SrcID and DestID fields. Completing agents may choose a simpler implementation that returns all completions in the received order regardless of the source agent. |
| Rule 14. | Requesting agents that issue Non-Posted messages to different target agents must be designed to accept out out-of-order Completions from different completing agents. In-order Completions are guaranteed by this specification only for Non-Posted messages with the same SrcID and DestID fields. |
| Rule 15. | Requesting agents can use the Tag field in Non-Posted messages only for its own agent-specific functionality. The tag field in Non-Posted messages must not affect receiver processing of the Request. |
| Rule 16. | The Tag field in Non-Posted messages must not be used to define ordering across Completions either from the same or from different completing agents. |
| Rule 17. | The Tag field in Posted messages can be used for source and target agent specific functionality and can affect receiver processing of the Request. |
| Rule 18. | Agents use global opcode 0x20 in response to Non-Posted messages requiring Completions without data. |
| Rule 19. | Agents use global opcode 0x21 in response to Non-Posted messages requiring Completions with data. |
| Rule 20. | At any given time, there can be only a single outstanding Non-Posted broadcast or multicast request in the entire sideband network. It is the collective responsibility of the agents to enforce this global property. |
| Rule 21. | Multiple Posted broadcast and multicast messages are allowed in the fabric provided that no router has multiple, outstanding broadcast or multicast Posted messages that arrived on different ingress ports. A Posted broadcast or multicast message is considered outstanding within the router from the time the start of message is received on its ingress port. For routers without egress buffers, it remains outstanding until it has put the end of the message toward all targeted |

| | |
|---|---|
| Rule 22. | All Non-Posted messages which do not require data returned must be completed with a Completion without data message. |
| Rule 23. | All Non-Posted messages which require data returned, if completed successfully, must be completed with a Completion with data message. |
| Rule 24. | All Non-Posted messages which require data returned, if completed with a Completion Status other than successful, must be completed with a Completion without data message. |
| Rule 25. | The npput and pcput signals may not be asserted in the same clock cycle. |
| Rule 26. | The payload and eom signals are valid only if a put is asserted; otherwise, they are undefined. |
| Rule 27. | A message flit cannot be put unless there is a corresponding credit for that flit type. |
| Rule 28. | A message flit put in clock N cannot be a function of a credit update in clock N, but only a function of a credit update in clock N-1 or earlier. |
| Rule 29. | One Posted or Completion message must complete before another Posted or Completion can be started. |
| Rule 30. | A Non-Posted message must complete before another Non-Posted can start. |
| Rule 31. | All endpoints and routers must advertise a minimum of one Posted/Completion credit and one Non-Posted credit. |

(Table 3 continued: egress ports. For routers with egress buffers, it remains outstanding until the last flit of the broadcast or multicast message has made it to all of the routers' egress buffers. The mechanism used to enforce this rule can be implementation specific.)

Figure 7:
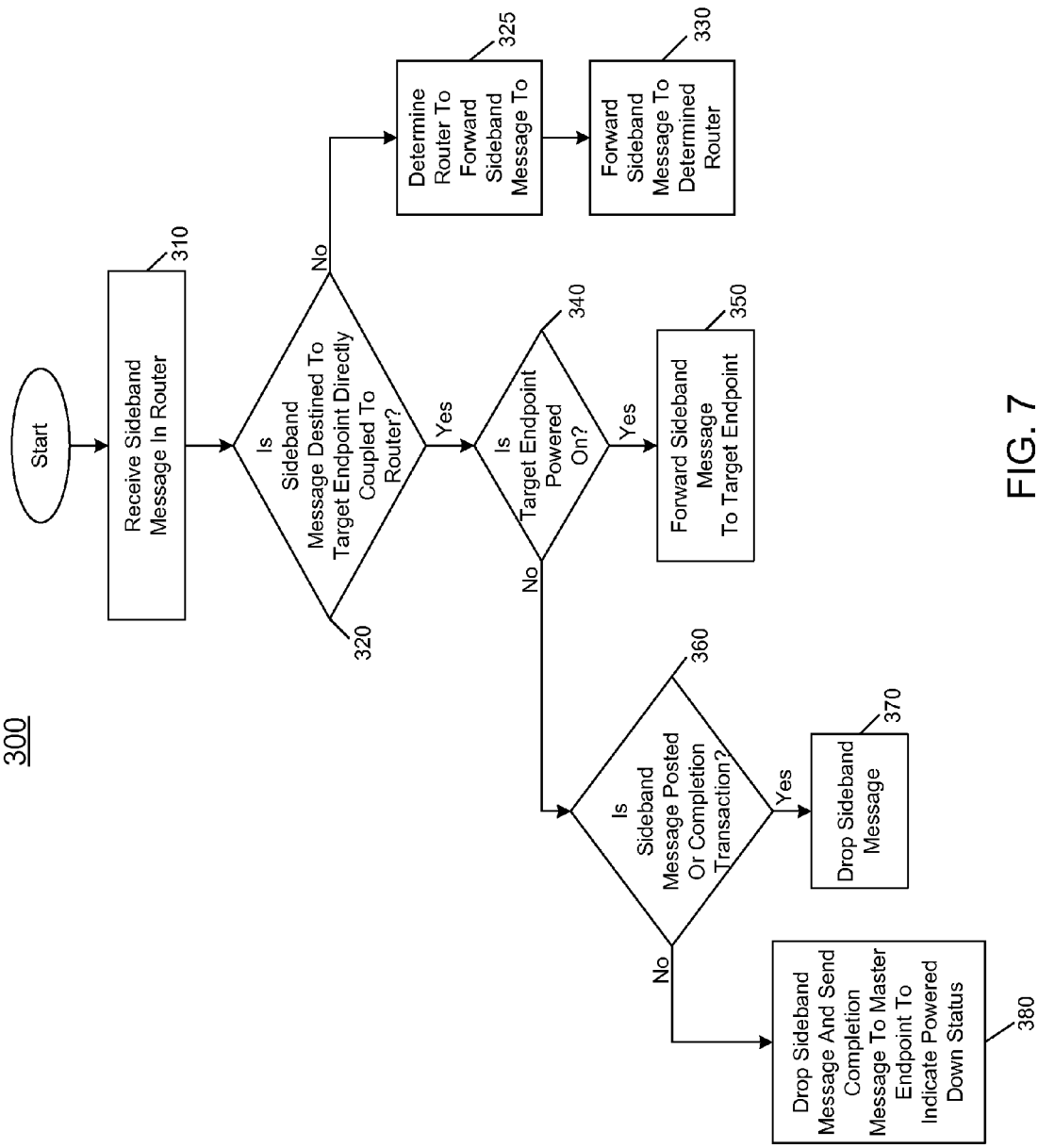
FIG. 7 is a flow diagram of a method of handling sideband messages for a powered down endpoint.

With regard to error handling, an endpoint that receives a posted request that it does not support can silently drop the request, and return the credits. However, an endpoint that receives a non-posted request that it does not support returns a completion with the response status field set appropriately to indicate the request was unsuccessful or not supported. A router in accordance with an embodiment of the present invention can further handle management of packets received for endpoints coupled to the router that may be in a powered down state. Referring now to FIG. 7, shown is a flow diagram of a method of handling sideband messages for a powered down endpoint. As seen, method 300, which can be implemented within a router can begin by receiving a sideband message in the router (block 310). Next it can be determined whether this message is destined to a target endpoint that is directly coupled to the router (diamond 320). In one embodiment, this determination can be based on a routing table present in the router. If not, control passes to block 325 where it can determine the router to which the message should be forwarded. Again this can be based on a routing table in the router. Accordingly, control passes to block 330 where the message can be forwarded to the determined router.

Still referring to FIG. 7, if instead the message is destined to an endpoint coupled directly to the router, control passes to diamond 340 where it can be determined whether the target endpoint is powered on. Note that this determination can be performed in different manners according to various embodiments. As an example, in one embodiment an additional power status channel can be coupled between each endpoint and the router, and set to a valid high state when the given endpoint is powered on and set to a logic low disabled state when the endpoint is powered off. Thus in such embodiments this power signal can be used to make the determination. In other embodiments, rather than a separate link, a message can be sent from the endpoint to the router to indicate that it is about to be powered off, and the router can set an entry in a status vector associated with its directly coupled endpoints accordingly. Note that this message can be sent via the payload channel. In still other embodiments, a power control unit of the SoC can be in communication with the routers to indicate power status of the various endpoints.

Still referring to FIG. 7, if the endpoint is powered on, control passes to block 350 where the message destined to the target can be sent to the target endpoints. Otherwise if the target endpoint is not powered on, control passes to diamond 360 where it can be determined whether the sideband message is a posted or completion transaction. If so, the sideband message can simply be dropped (block 370). Otherwise for a non-posted message, control passes to block 380 where the sideband message can be dropped and a completion message can be sent to the master endpoint to indicate the powered down status. Although shown with this particular implementation in the embodiment of FIG. 7, understand the scope of the present invention is not limited in this regard.

Sideband message interface ordering rules in accordance with an embodiment of the present invention describe the transaction level ordering rules that are to be maintained at an agent's sideband interface. Note that the message types, and ordering rules, can be a subset of a PC-based interface specification such as a given PCI specification. Fabrics ensure compliance to system-level, producer-consumer ordering rules by ensuring that transaction-level ordering rules are followed for each implemented queue in the fabric. In Table 4, the columns represent a first issued transaction and the rows represent a subsequently issued transaction. The ordering point for a sideband message is the first flit of a message.

TABLE 4

| | Pass Column | |
|---|---|---|
| Row | Non-Posted Message (Column 2) | Posted or Completion Message (Column 3) |
| Non-Posted Message (Row A) | No | No |
| Posted or Completion Message (Row B) | Yes | No |

The table entry indicates the ordering relationship between the two transactions. The table entries are defined as follows: Yes—the second transaction (row) must be allowed to pass the first (column) to avoid deadlock. When blocking occurs, the second transaction is required to pass the first transaction. Fairness is comprehended to prevent starvation. A message is blocked if there are no credits for that message type. No—the second transaction (row) must not be allowed to pass the first (column) transaction. Table 5 below provides an explanation of each entry in the above Table 4.

TABLE 5

| | |
|---|---|
| A2 | No - Non-Posted messages from Node A to Node B on a sideband message interface component are in strict order and must not pass each other. |
| A3 | No - Non-Posted messages from Node A to Node B on a sideband message interface component must push any Posted/Completion messages from Node A to Node B of the same components. This is required to allow flushing Posted/Completion transactions to their destinations using a Non-Posted transaction. |
| B2 | Yes - Posted/Completion messages from Node A to Node B on a sideband message interface component must be allowed to pass any blocked Non-Posted messages from Node A to Node B of the same component to avoid deadlocks. |
| B3 | No - Posted/Completion messages from Node A to Node B on a sideband message interface component are in strict order and must not pass each other. |

When the above interface ordering rules are observed, no other restrictions exist on interleaving of posted/completion messages with non-posted messages.

Figure 8:
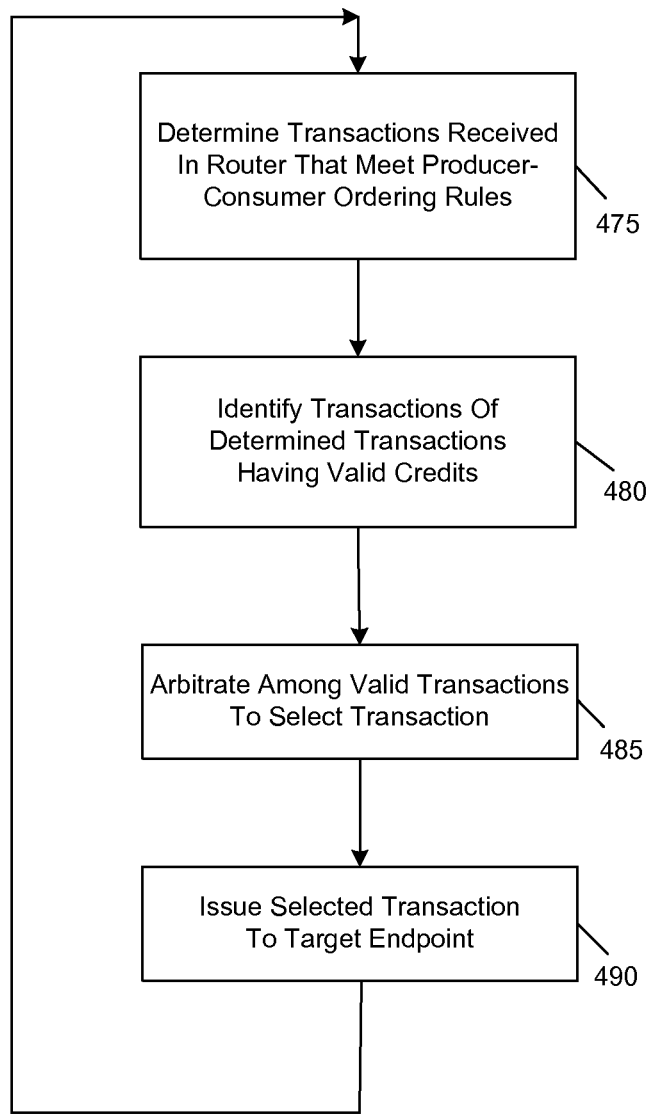
FIG. 8 is a flow diagram of arbitrating between sideband messages received in a router in accordance with an embodiment of the present invention.

Referring now to FIG. 8, shown is a flow diagram of arbitrating between sideband messages received in a router in accordance with an embodiment of the present invention. As shown in FIG. 8, method 470 may be implemented via router logic, including transaction ordering logic and arbitration logic. As seen, method 470 may begin by determining whether producer-consumer ordering rules have been met for various transactions received in the router (block 475). These transactions may be in multiple transaction queues of the router. For example, a top entry of each queue of multiple channels of the router can be analyzed to determine whether the corresponding transaction has met producer-consumer ordering rules. Although the scope of the present invention is not limited in this regard, in one embodiment this determination can be based upon a status indicator such as a ready bit or other means for identifying a transaction that has met ordering rules (such as a counter-based mechanism).

Next, at block 480 of these transactions that have met the ordering rules, transactions having valid credits can be identified. More specifically, for each of the transactions, a corresponding credit counter of the fabric can be checked to determine whether a valid credit is available for the given type of transaction. Accordingly at block 480 a set of transactions having valid credits can be identified. Then at block 485, an arbitration can be performed from among these valid transactions. The arbitration can be performed in various manners. For example, in some implementations a round robin-based arbitration protocol can be performed. In other implementations a priority-based fixed priority arbitration can be used. Thus at block 485, the arbiter of the fabric can select one transaction to send in a given clock cycle. Thus at block 490 the selected transaction corresponding to this arbitrated transaction can be issued from the fabric to the identified target endpoint. As seen in FIG. 8, method 470 may iterate. Note that in various embodiments, the arbitration can be performed on a flit-by-flit basis such that flits of different transactions can be sent in an interleaved manner.

Every message type to be completed via the sideband interface may have its own distinct opcode. This opcode can be used by endpoints to define the structure of the message packet. The sideband message interface can communicate both global and endpoint-specific messages. Global messages have the same meaning to all agents. For endpoint-specific messages, only the endpoint sending the message and the endpoint receiving the message agree on the message definition. The message opcode space may be divided between global messages, endpoint-specific messages, and reserved messages as shown in Table 6. Global messages and their corresponding opcodes cannot be changed. Each endpoint in an IOSF-compliant sideband message interface interprets the global message the same, but it does not need to support all the global opcodes.

Table 6 defines the global and local (endpoint specific) messages and their opcodes in accordance with an embodiment of the present invention. All other opcodes within the global address ranges are reserved. Endpoint-specific messages and their corresponding opcodes can be defined for project-specific needs. An endpoint uses only opcodes that are either endpoint specific or defined globals. No reserved opcodes within the global codes ranges or specifically reserved opcodes may be selected.

TABLE 6

| Message Type | Opcode Type | Start-End Range | Number of Opcodes |
|---|---|---|---|
| Register Access | Global | 8'h00-8'h0f | 16 |
| | Endpoint Specific | 8'h10-8'h1f | 16 |
| Completion without Data | Global | 8'h20-8'h20 | 1 |
| Completion with Data | Global | 8'h21-8'h21 | 1 |
| Reserved | Reserved | 8'h22-8'h3f | 30 |
| Message with Data | Global | 8'h40-8'h5f | 32 |
| | Endpoint Specific | 8'h60-8'h7f | 32 |
| Simple Message | Global | 8'h80-8'h9f | 32 |
| | Endpoint Specific | 8'ha0-8'hff | 96 |

By providing a sideband interface in accordance with an embodiment of the present invention, chip design can be simplified. For example, easier IP block integration can be realized by making use of IP blocks that have a generic messaging channel instead of fixed function, dedicated wires. Thus it is easier for SoC integrators to automate assembly of their SoCs from component building blocks because there are no special connectivity rules to be followed. This decreases time-to-market by decreasing the probability of integration-related bugs and making the integration process more efficient and less error-prone. By providing a generic interface, the sideband message interface can convey many different types of information using fewer global wires. In contrast to the typical approach of providing dedicated wires that provide access to IP block internal registers, convey interrupt information, fuses, etc., embodiments may dramatically decrease the number of global wires to be routed from the various IP blocks integrated on chip.

The ordering model of the sideband message interface allows writes to pass reads, and provides much of the features of the standard PCI model, but at reduced complexity via a simplified PCI ordering model. Specifically, the sideband interface treats posted and completion transactions as one combined type. This optimization allows for a simpler implementation while maintaining the semantic correctness of the original PCI ordering model which requires posteds to push completions while still allowing posteds and completions to pass non-posteds. Embodiments can realize increased performance due to this simplified PCI-ordering model and in contrast to a standard in-order network on chip fabric, the ordering model which allows writes to pass reads provides increased performance.

The flexibility of the sideband message interface allows IP providers and SoC integrators many possibilities for adding their own messages with a generic ability to define any type of message. This flexibility provides end-users with the ability to innovate above and beyond what the original architects might have envisioned. While the sideband message interface provides user flexibility, it also standardizes opcodes for many expected global functions such as memory reads/ writes, configuration reads/writes, IO reads/writes, completions, etc. Such standardization increases interoperability compared to more generic interfaces that allow full flexibility of all opcodes.

Figure 9:
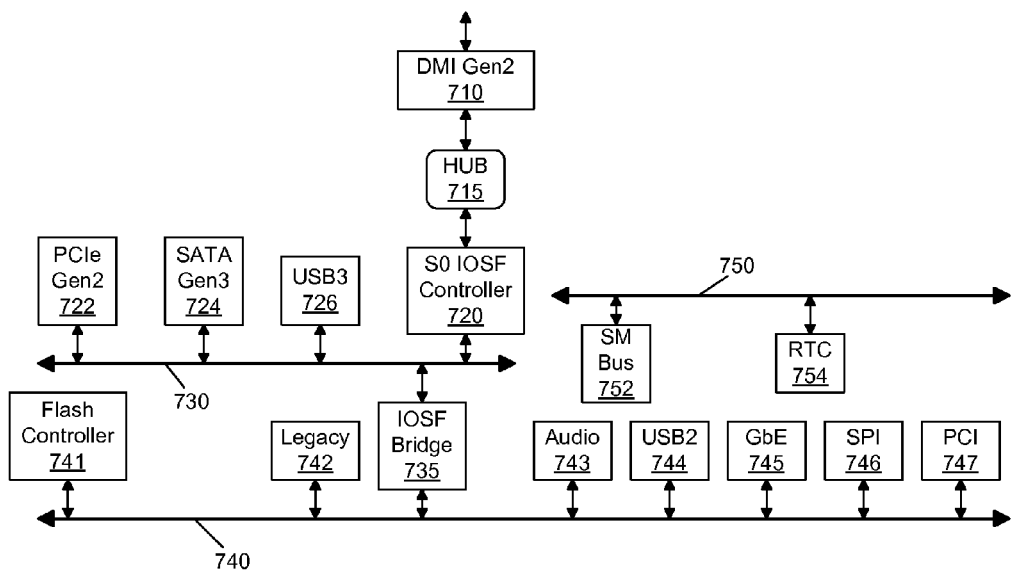
FIG. 9 is a more detailed block diagram of a portion of a SoC in accordance with an embodiment of the present invention.

Although the SoCs of FIGS. 3 and 4 are at a high level, understand that additional functionality may be present. Referring now to FIG. 9, shown is a more detailed block diagram of a portion of a SoC in accordance with an embodiment of the present invention. As shown in FIG. 9, the portion of SoC 700 shown may correspond to non-core portions coupled below a memory controller hub or other interface logic that can in turn interface to multiple processor cores, as well as to system memory.

Thus as seen, an off-die interface 710 (which in one embodiment can be a direct media interface (DMI)) may couple to a hub 715, e.g., an input/output hub that in turn provides communication between various peripheral devices. Although not shown for ease of illustration in FIG. 9, understand that various engines such as a manageability engine and a virtualization engine can also be directly coupled to hub 715.

To provide connection to multiple buses, which may be multi-point or shared buses in accordance with the IOSF specification, an IOSF controller 720 may couple between hub 715 and bus 730, which may be an IOSF bus that thus incorporates elements of the fabric as well as routers. In the embodiment shown in FIG. 9, first IOSF bus 730 may have coupled to it various controllers to provide for control of off-chip devices. Specifically, seen is a PCIe controller 722, a SATA controller 724, and a USB controller 726. In turn, a second IOSF bus 750 may couple to a system management bus 752 and to a real time clock 754.

As further seen in FIG. 9, first IOSF bus 730 may couple to an IOSF bridge 735 for both primary and sideband information that in turn provides interconnection to a third bus 740, e.g., of a different protocol, to which various controllers and components may be attached. In the embodiment shown in FIG. 9, such components include a flash controller 741 to provide an interface to a non-volatile memory, a legacy device 742, which may implement various legacy functions, e.g., of a PCI specification and further may include an interrupt controller and timer. In addition, interfaces for audio 743, USB 744, gigabyte Ethernet (GbE) 745, serial peripheral interface (SPI) 746 and PCI 747 may all be provided. Although shown with this particular implementation in the embodiment of FIG. 9, understand the scope of the present invention is not limited in this regard.

Figure 10:
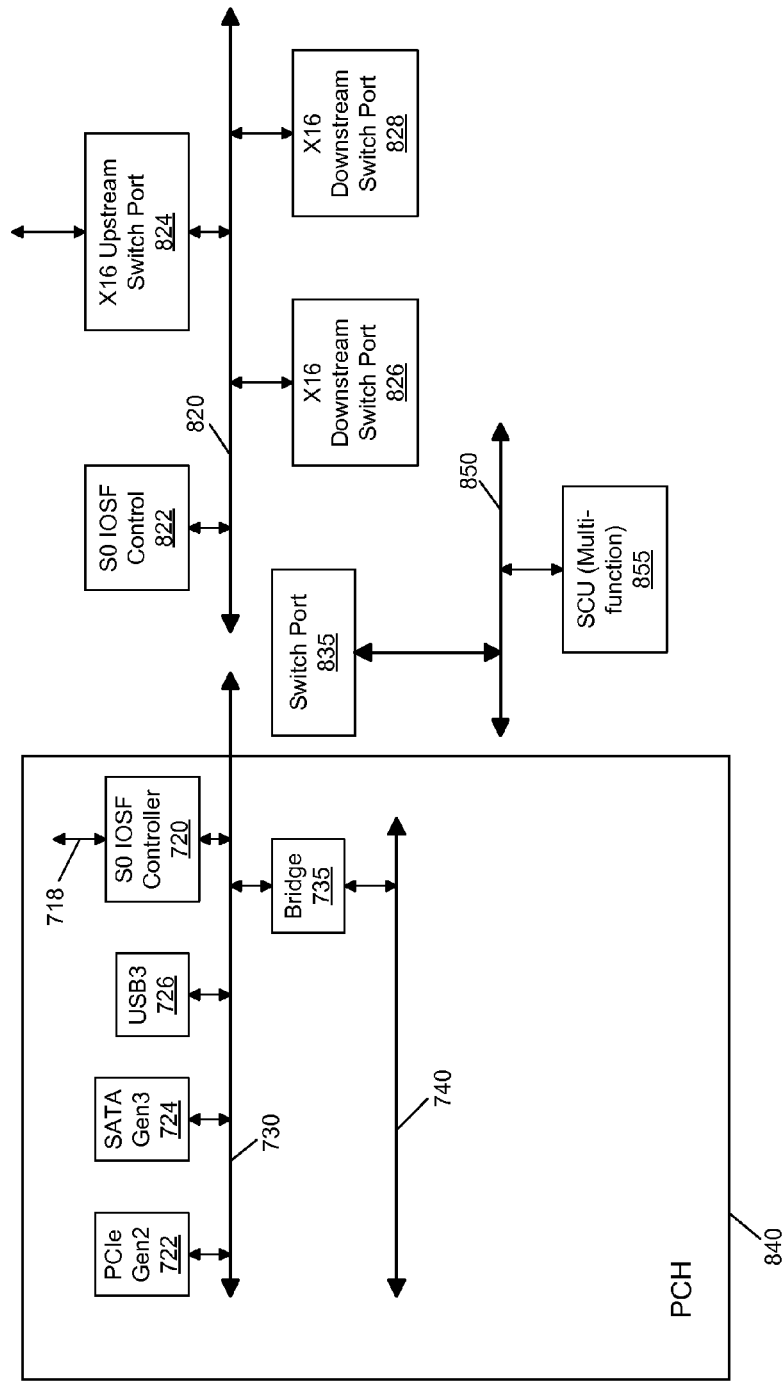
FIG. 10 is a block diagram of another SoC in accordance with an embodiment the present invention.

Still other implementations are possible. Referring now to FIG. 10, shown is a block diagram of another SoC in accordance with an embodiment the present invention. As shown in FIG. 10, SoC 800 may be configured for use, e.g., in server systems. As seen in FIG. 9, SoC may include a platform controller hub (PCH) 840, which may generally include components such as seen in the embodiment of FIG. 9. Namely, multiple IOSF buses 730 and 740 may be present, along with a bridge 735 to couple the buses. Bus 730 may include various agents coupled to it, including a PCIe controller 722, SATA controller 724, and a USB controller 726. In turn, via an IOSF controller 720, communication may occur via an additional bus 718, which may communicate with upstream devices, such as cores or other processing units (not shown for ease of illustration in the embodiment of FIG. 10).

As further seen in FIG. 10, for providing communications with other server-based components, an additional IOSF bus 820 may be provided, which in turn can communicate with an IOSF controller 822 and an upstream switch port 824 (e.g., an X16 port) that may be coupled to an upstream bus 825. Also coupled to bus 820 may be multiple downstream switch ports 826 and 828.

Furthermore, to enable communications, e.g., with storage units of a server-based system, a switch port 830 may couple between bus 820 and another IOSF bus 850, which in turn may be coupled to a storage controller unit (SCU) 855, which may be a multi-function device for coupling with various storage devices.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system on a chip (SoC) comprising:
a plurality of agents each corresponding to an intellectual property (IP) logic; and
a fabric to couple the plurality of agents, the fabric including a router to provide out-of-band communications between the plurality of agents, wherein the router is to perform a subset of ordering rules of a personal computer (PC)-based specification with respect to sideband messages including the out-of-band communciations received in the router from the plurality of agents, wherein the subset of ordering rules is to treat a posted message and a completion message as a common message type for purposes of the subset of ordering rules.

2. The SoC of claim 1, wherein the router is to send a first completion message directed from a first agent to a second agent to the second agent when a first non-posted message directed from the first agent to the second agent is blocked.

3. The SoC of claim 1, wherein the router is to prevent transmission of a completion message directed from a first agent to a second agent when a posted message directed from the first agent to the second agent is blocked.

4. The SoC of claim 1, wherein the router is to apply the subset of ordering rules based on a message type associated with a sideband message, and the sideband message is communicated with an indication of the message type.

5. The SoC of claim 1, wherein the router is to identify a type of each of the sideband messages as either a non-posted message or one of a posted message and a completion message, and to apply the subset of ordering rules according to the identified type.

6. The SoC of claim 1, wherein the router is to guarantee producer-consumer ordering and deadlock avoidance with respect to a plurality of sideband messages based on the subset of ordering rules.

7. The SoC of claim 1, wherein the router is to receive a plurality of sideband messages and identify a subset of the plurality of sideband messages that meet the subset of ordering rules, and to thereafter arbitrate between the subset of the plurality of sideband messages to select at least one flit of one of the subset of the plurality of sideband messages to send to a target agent of the plurality of agents.

8. The SoC of claim 1, wherein the PC-based specification is a Peripheral Component Interconnect (PCI) specification.

9. An apparatus comprising:
a fabric to couple a plurality of agents of a system on a chip (SoC), the fabric including a primary interface to communicate transactions between the plurality of agents and further including at least one router to communicate out-of-band information between the plurality of agents, wherein the at least one router is coupled to a sideband interface of each of the plurality of agents via a point-to-point link including a payload channel to communicate the out-of-band information, wherein a plurality of out-of-band information types can be communicated via the payload channel, wherein the at least one router is to forward a posted message to a first agent, the posted message including an interrupt directed to the first agent, and wherein the router is to order the posted message ahead of a non-posted message directed to the first agent that is blocked.

10. The apparatus of claim 9, wherein a payload of a message sent via the sideband interface is to communicate the out-of-band information including one of interrupt information, power management information and fuse distribution information.

11. The apparatus of claim 9, wherein the at least one router is to forward a write message directed to a first agent ahead of a read message directed to the first agent.

12. The apparatus of claim 9, wherein the payload channel replaces dedicated wires for the out-of-band information.

13. The apparatus of claim 9, wherein the payload channel is to communicate a first set of opcodes to provide global message types to be decoded by the plurality of agents and a second set of opcodes to provide local message types to be decoded by a subset of the plurality of agents.

14. The apparatus of claim 13, wherein a first agent is to communicate a first sideband message including one of the second set of opcodes only to an agent of the plurality of agents that is configured to decode the opcode of the second set of opcodes.

15. The apparatus of claim 13, wherein the first set of opcodes are fixed according to a specification and the second set of opcodes are configurable by a designer of the SoC.

16. A method comprising:
receiving a sideband message from a master endpoint in a router of a system on chip (SoC) having a plurality of endpoints including the master endpoint;
determining if a target endpoint for the sideband message is in a powered on state, and if so forwarding the sideband message to the target endpoint;
if the target endpoint is in a powered off state, dropping the sideband message if the sideband message is a posted transaction or a completion transaction; and
dropping the sideband message and sending a completion message to the master endpoint to indicate the powered off state of the target endpoint if the sideband message is a non-posted transaction.

17. The method of claim 16, further comprising determining if the sideband message is destined to a target endpoint directly coupled to the router and if not, determining another router to forward the sideband message to.

18. The method of claim 16, wherein determining if the target endpoint is in the powered on state comprises receiving a power signal from a power control unit.

19. The method of claim 18, further comprising receiving the power signal via a link separate from a payload channel of a point-to-point link that couples the target endpoint and the router.

* * * * *